June 20, 1967   M. P. NEAL   3,326,448

CORRUGATED FIBRE BOARD CONTAINER

Original Filed Sept. 19, 1961

INVENTOR
MORRIS P. NEAL

BY *Newton, Hopkins,
Jones & Ormsby*

ATTORNEYS

United States Patent Office 3,326,448
Patented June 20, 1967

3,326,448
CORRUGATED FIBRE BOARD CONTAINER
Morris P. Neal, Clearwater, Fla., assignor to A-B-C Packaging Machine Corporation, Largo, Fla., a corporation of Illinois
Continuation of application Ser. No. 394,898, Sept. 8, 1964, which is a division of application Ser. No. 139,163, Sept. 19, 1961, now Patent No. 3,190,192. This application Oct. 15, 1965, Ser. No. 496,328
9 Claims. (Cl. 229—45)

This application is a continuation of my copending application Ser. No. 394,898, filed Sept. 8, 1964, now abandoned, which in turn is a divisional application of Ser. No. 139,163, filed Sept. 19, 1961, now U.S. Patent No. 3,190,- 192, issued June 22, 1965.

This invention relates to corrugated fibre board, and is more particularly concerned with joined fibre board structure. The present invention is particularly related to the sealing or joining of flaps of a box to form closed ends thereof and is particularly useful as an adjunct for adhesive in retaining the flaps of a box having wet adhesive thereon in a closed condition.

In the past, two general methods have been employed for sealing the overlapped flaps forming the upper and lower ends of a box. One method is to pass staples through the flaps and bend the ends of the staples. Staples, however, are expensive and require either complicated and extensive machinery or considerable hand labor for their installation. The application of staples is also time consuming.

The second method of joining the flaps of a box is to apply adhesive to the flaps and then hold the flaps in a closed condition until the adhesive has had sufficient time to become tacky or dry. This, of course, is also time consuming and in most instances requires rather elaborate equipment through which successive boxes are fed. Thus, while the sealing of boxes with adhesive is less expensive than staples from a material utilization standpoint, it requires the allocation of considerable plant floor area which may not readily be available.

The present invention attempts to overcome the disadvantages mentioned above by providing a method of joining two layers of fibre board together utilizing material from one layer of fibre board and urging the same into the next layer of fibre board. While this method alone is sufficient to join the flaps of boxes and retain such flaps in a closed condition, it may also be utilized in conjunction with adhesive sealing of the flaps to hold the flaps in a closed condition while the adhesive sets.

It is an object of the present invention to provide a new and novel fibre board structure wherein two overlapped plies are joined together without the agency of additional material such as staples and adhesive.

Another object of the present invention is to provide a means for maintaining the overlapped flaps of a fibre board box in a closed condition while an adhesive previously applied to the flaps becomes set.

Other objects, features and advantages of the present invention will become apparent from the following description when taken in conjunction with the accompanying drawings wherein like characters of reference designate corresponding parts throughout the several views and wherein.

Figure 1:
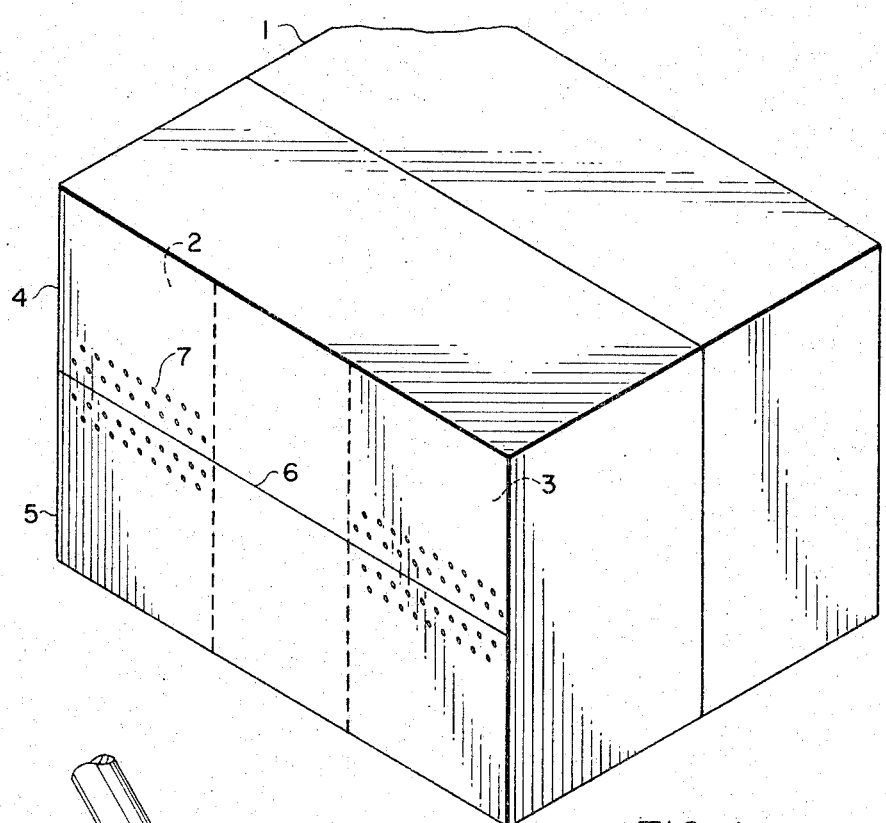
FIG. 1 is a partial view of a fibre board box having its flaps tacked down in accordance with the present invention.

Referring first to FIG. 1, there is shown a box 1 which may be of a variety of dimensions and shapes. The end of the box 1 comprises inner folded side flaps 2 and 3 over which lie outer folded side flaps 4 and 5. The outer side flaps are of such a size that when folded their free ends lie adjacent each other forming a seam 6.

The outer flaps 4 and 5 are secured to the inner flaps 2 and 3 by a series of punched holes 7 arranged in parallel longitudinal rows located adjacent the seam 6 in areas where the inner and outer flaps overlap. Each of the holes 7 are punched in such a manner as to provide a specific interlocking structure between the inner and outer flaps.

These folded flaps of the box 1 may be secured solely by means of the punched holes or, alternatively, an additional adhesive previously coated on the flap in their overlying areas may be applied to aid in securing the flaps in a more permanent manner.

Figure 2:
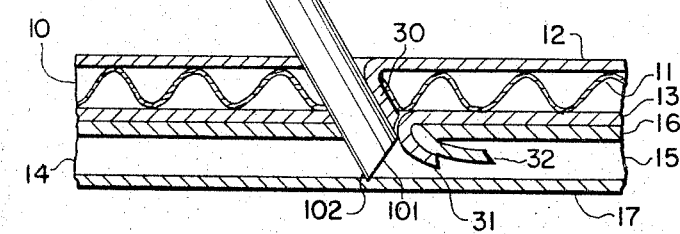
FIG. 2 is a sectional view of a pair of overlapping flaps punched and secured to each other in accordance with the present invention and wherein the punching tool is still in position.

The interlocking structure formed by the punched holes 7 is depicted in more detail in FIG. 2. Therein is shown an outer flap 10 overlying an inner flap 14. Both flaps are of conventional corrugated fibre board construction with flap 10 comprising a corrugated layer 11 having outer liners 12 and 13 while flap 14 comprises a corrugated layer 15 having outer liners 16 and 17. Due to the manner in which the corrugated fibre board boxes are assembled, the corrugated layers 11 and 15 will be so arranged that their corrugations will be positioned at right angles with respect to each other.

Flaps 10 and 14 are secured together by forcing a punching tool 100 through the outer flap 10 and partially through the inner flap 14 at an acute angle with respect to the planar surfaces of the flaps. At the forward most end 101 of the punching tool is a cutting edge 102. The opposite edge 103 is preferably rounded or beveled in such a manner so as to prevent severing of any portion of the flaps as the punching tool passes therethrough.

As the punching tool 100 first engages the outer flap 10 only the cutting edge 102 comes into contact with the outer liner 12 due to the angle at which the punching tool approaches the flap. Further movement of the punching tool into flap 10 causes a crescent or U-shaped cut to be made in liner 12 thereby forming the tab 30. As the punching tool continues into flap 10 the thus-formed tab 30 is bent downward and into the corrugated layer 11. It is also bent back on liner 12 somewhat due to the angular relationship of the punching tool. The tab 30 remains integral with liner 12 at its uncut hinge portion.

In passing through liners 13 and 16, which are in juxtaposed relationship to each other, the punching tool 100 forms corresponding crescent or U-shaped cuts therein which, in turn, become tabs 31 and 32. The tabs 31 and 32 mutually engage each other and become interlocked as they are bent inward on their uncut hinge portions into the corrugated layer 15 and back onto each other in a hooked manner.

Movement of the punching tool 100 is terminated just prior to passage through liner 17 of flap 14. The punching tool 100 may then be withdrawn from the overlapping flaps thus leaving them in a secured position due to interlocking tabs 31 and 32.

Figure 3:
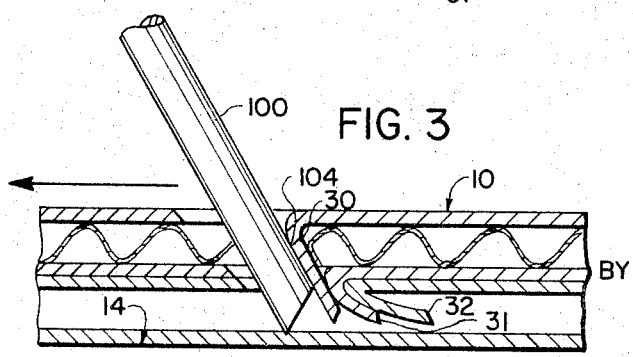
FIG. 3 is a sectional view of the same punched and secured flap assembly shown in FIG. 2 wherein the assembly has been moved horizontally to the left relative to the stationary punching tool.

While the interlocking tab arrangement as shown in FIG. 2 is sufficient to maintain the folded flaps of a corrugated fibre board box in place, it may at times be desirable to provide this means of securing the flaps with additional strength. In this regard, reference should be made to FIG. 3. With the punching tool 100 left in position within the flaps 10 and 11 the assembly is horizontally moved relative to the punching tool. This movement is performed in such a manner as to force the previously formed tabs 30, 31 and 32 against the stationary surface 104 of the punching tool. The tabs 30, 31 and 32 become enlarged due to tearing action on liners 12, 13 and 16. As a result, tab 30 extends down into the lower flap 14 and interlockingly engages tabs 31 and 32 which at the same time become enlarged and interlocked to a greater degree.

Of course, the hole formed by the punching tool will also become enlarged. The enlarged hole aids in retracting the punching tool without disturbing the interlocked tabs.

The above-described securing means for the overlapping flaps of corrugated fibre board boxes may be used alone or in combination with an adhesive. It is extremely advantageous to use the securing means of the present invention to maintain the flaps of these boxes in a closed condition immediately after a wet adhesive has been applied. The present invention thereby serves to maintain the flaps in a closed condition until such adhesive dries.

Thus, having described the present invention, it will be apparent to those skilled in the art that certain variations and modifications may be made without departing from the spirit and scope of the invention and is to be limited only as defined in the appended claims.

What is claimed as invention is:

1. A corrugated fibre board container having overlapped outer and inner flaps folded to close an end of the container, each flap comprising a corrugated core to which is secured an inner and outer liner, the inner liner of the outer flaps overlying in adjacent relationship the outer liner of the inner flaps, perforations extending completely through the outer flaps and partially through the inner flaps, each perforation forming tabs in the outer and inner liners of the outer flaps and in the outer liner of the inner flaps, said tabs defining a portion of the peripheries of the perforations and extending therethrough and also being integral with their respective flaps, both said perforations and at least some portions of said tabs extending at an acute angle with respect to the plane defined by the overlapped flaps, the lower portion of the tabs formed in the inner liner of the outer flaps extending through the corresponding perforation in the inner flap and in interlocking engagement with the tabs formed in the outer liner of the inner flaps.

2. A corrugated fibre board container as defined in claim 1 wherein the lower portion of the tabs formed in the outer liner of the outer flaps extend through the corresponding perforation in the inner flap and are in interlocking engagement with the already interlocked tabs of the inner liner of the outer flaps and the outer liner of the inner flaps.

3. A corrugated fibre board container as defined in claim 1 wherein the outer and inner flaps are also secured together by means of an adhesive.

4. A corrugated fibre board container having overlapped outer and inner flaps folded to close an end of the container, each flap comprising a corrugated core to which is secured an inner and outer liner, the inner liner of the outer flaps overlying in adjacent relationship the outer liner of the inner flaps, perforations extending completely through the outer flaps and the inner flaps, each perforation forming tabs in the outer and inner liners of the outer flaps and in the outer liner of the inner flaps, said tabs defining a portion of the peripheries of the perforations and extending therethrough and also being integral with their respective flaps, both said perforations and at least some portions of said tabs extending at an acute angle with respect to the plane defined by the overlapped flaps, the lower portion of the tabs formed in the inner liner of the outer flaps and the tabs formed in the outer liner of the inner flaps extending into and terminating within the corrugated core of the inner flaps, said lower portion being in interlocking engagement with the tabs formed in the outer liner of the inner flaps.

5. A corrugated fibre board container as defined in claim 4 wherein the lower portion of the tabs formed in the outer liner of the outer flaps extend through the corresponding perforation in the inner flap and are in interlocking engagement with the already interlocked tabs of the inner liner of the outer flaps and the outer liner of the inner flaps.

6. A corrugated fibre board container as defined in claim 4 wherein the outer and inner flaps are also secured together by means of an adhesive.

7. A corrugated fibre board container having:
  (a) overlapped outer and inner flaps folded to close an end of the container, each flap comprising a corrugated core to which is secured an inner and outer liner, the inner liner of the outer flaps overlying in adjacent relationship the outer liner of the inner flaps;
  (b) perforations extending completely through the outer flaps and at least partially through the inner flaps;
  (c) each perforation forming tabs in the outer and inner liners of the outer flaps and in the outer liner of the inner flaps, said tabs defining a portion of the peripheries of the perforations and extending therethrough and also being integral with their respective flaps, the tabs of the inner liner of the outer flaps and the outer liner of the inner flaps being interlocked the lower portion of the tabs formed in the outer liner of the outer flaps extending into and terminating within the corrugated core of the inner flaps, said lower portion being in interlocking engagement with the interlocked tabs of the inner liner of the outer flaps and the outer liner of the inner flaps.

8. A corrugated fibre board container as recited in claim 7 wherein at least some portions of said tabs extend at an acute angle with respect to the plane defined by the overlapped flaps.

9. A corrugated fibre board container having overlapped outer and inner flaps folded to close an end of the container, each flap comprising a corrugated core to which is secured an inner and outer liner, the inner liner of the outer flaps overlying in adjacent relationship the outer liner of the inner flaps, perforations extending completely through the outer flaps and partially through the inner flaps, each perforation forming tabs in the outer and inner liners of the outer flaps and in the outer liner of the inner flaps, said tabs defining a portion of the peripheries of the perforations and extending therethrough and also being integral with their respective flaps, the lower portion of the tabs formed in the inner liner of the outer flaps extending through the corresponding perforation in the inner flap and in interlocking engagement with the tabs formed in the outer liner of the inner flaps.

References Cited

UNITED STATES PATENTS

| 893,616   | 7/1908  | Ferres         | 229—37  |
| 1,837,451 | 12/1931 | Lee.           |         |
| 2,024,369 | 12/1935 | Kaiser         | 93—1.1  |
| 2,297,948 | 10/1942 | Eisenhauer     | 113—116 |
| 2,486,204 | 10/1949 | Praizner       | 93—1.1  |
| 2,874,666 | 2/1959  | Thor           | 93—1.1  |
| 3,010,199 | 11/1961 | Smith et al.   | 29—509  |

JOSEPH R. LECLAIR, *Primary Examiner.*

GEORGE O. RALSTON, *Examiner.*